US012752752B2

(12) United States Patent
Vey et al.

(10) Patent No.: US 12,752,752 B2
(45) Date of Patent: Oct. 6, 2026

(54) METHOD FOR OPERATING A BRAKE OF A MOTOR VEHICLE, BRAKE ASSEMBLY AND STORAGE MEDIUM

(71) Applicant: Continental Automotive Technologies GmbH, Hannover (DE)

(72) Inventors: Christian Vey, Petersberg (DE); Jens Hoffmann, Darmstadt (DE); Martin Kruse, Frankfurt am Main (DE); Mathias Haag, Darmstadt (DE); Martin Gädke, Hofheim (DE)

(73) Assignee: CONTINENTAL AUTOMOTIVE TECHNOLOGIES GMBH, Hannover (DE)

( * ) Notice: Subject to any disclaimer, the term of this patent is extended or adjusted under 35 U.S.C. 154(b) by 0 days.

(21) Appl. No.: 18/881,285

(22) PCT Filed: Jun. 28, 2023

(86) PCT No.: PCT/DE2023/200131
§ 371 (c)(1),
(2) Date: Jan. 4, 2025

(87) PCT Pub. No.: WO2024/008247
PCT Pub. Date: Jan. 11, 2024

(65) Prior Publication Data

US 2026/0014969 A1 Jan. 15, 2026

(30) Foreign Application Priority Data

Jul. 4, 2022 (DE) ..................... 10 2022 206 792.4
Sep. 2, 2022 (DE) ..................... 10 2022 209 146.9

(51) Int. Cl.
*B60T 8/172* (2006.01)
*B60T 13/74* (2006.01)
*B60T 1/06* (2006.01)

(52) U.S. Cl.
CPC ............ *B60T 8/172* (2013.01); *B60T 13/748* (2013.01); *B60T 1/067* (2013.01)

(58) Field of Classification Search
CPC ........ B60T 1/067; B60T 8/1806; B60T 8/172; B60T 13/748
See application file for complete search history.

(56) References Cited

U.S. PATENT DOCUMENTS 10,576,956 B2 3/2020 Baehrle-Miller
10,933,848 B2 3/2021 Bast
(Continued)

FOREIGN PATENT DOCUMENTS

DE 69200960 T2 4/1995
DE 19703838 A1 8/1998
(Continued)

OTHER PUBLICATIONS

German Office Action dated Feb. 16, 2023 for the priority German Patent Application No. 10 2022 209 146.9 and machine translation of same.
(Continued)

*Primary Examiner* — Long T Tran
(74) *Attorney, Agent, or Firm* — Buchanan Ingersoll & Rooney PC

(57) ABSTRACT

A method for operating a brake of a motor vehicle, wherein the brake has an actuator, which moves to positions along a path, wherein a braking torque/travel characteristic curve is recorded while the motor vehicle is in motion and is used for keeping the motor vehicle stationary is disclosed. Also an associated brake assembly and an associated storage medium are disclosed.

10 Claims, 4 Drawing Sheets

(56) References Cited

U.S. PATENT DOCUMENTS

| | | | | |
|---|---|---|---|---|
| 2013/0325278 | A1 | 12/2013 | Bieltz | |
| 2016/0053839 | A1 | 2/2016 | Putz | |
| 2016/0221469 | A1 * | 8/2016 | Cheng | B60K 6/48 |
| 2020/0191218 | A1 | 6/2020 | von Hayn | |
| 2023/0392659 | A1 * | 12/2023 | Putz | F16D 65/16 |
| 2024/0042983 | A1 * | 2/2024 | Zhang | G01D 5/04 |
| 2024/0326761 | A1 * | 10/2024 | Putz | B60T 8/17 |

FOREIGN PATENT DOCUMENTS

| | | | |
|---|---|---|---|
| DE | 19826132 | C2 | 6/2000 |
| DE | 102008037809 | A1 | 2/2010 |
| DE | 102015201556 | A1 | 8/2016 |
| DE | 102016203475 | A1 | 9/2017 |
| DE | 102017217413 | A1 | 4/2019 |
| DE | 102018203181 | A1 | 9/2019 |
| DE | 102019208356 | B3 | 8/2020 |
| DE | 102021213428 | A1 | 1/2022 |
| DE | 102020215965 | A1 | 6/2022 |
| EP | 1763462 | A1 | 3/2007 |
| WO | 03011668 | A1 | 2/2003 |
| WO | 2006003042 | A1 | 1/2006 |
| WO | 2019063279 | A1 | 4/2019 |

OTHER PUBLICATIONS

The International Search Report and the Written Opinion of the International Searching Authority mailed on Sep. 28, 2023 for the PCT Application No. PCT/DE2023/200131 which this application claims priority.

Office Action (Notice pursuant to Article 94(3) EPC) issued Jan. 16, 2026, by the European Patent Office in corresponding European Patent Application No. 23 739 110.7-1009 and an English machine translation of the Office Action. (9 pages).

* cited by examiner

METHOD FOR OPERATING A BRAKE OF A MOTOR VEHICLE, BRAKE ASSEMBLY AND STORAGE MEDIUM

TECHNICAL FIELD

The embodiments relate to a method for operating a brake of a motor vehicle, to an associated brake assembly and to an associated storage medium.

BACKGROUND

Brakes are typically used in motor vehicles to decelerate them in a targeted manner and/or to keep them stationary in a reliable manner. A brake typically generates a braking torque which leads to a deceleration of the vehicle and/or to keeping it stationary. However, it has proved difficult to actuate a brake when a vehicle is stationary such that it holds in a reliable manner and no adjustment is required.

SUMMARY

One object n is to provide a method for operating a brake of a motor vehicle which is carried out in an alternative or better manner than in known embodiments. Furthermore, one object is to provide an associated brake assembly. In addition, one object is to provide an associated storage medium.

Accordingly, these objects are achieved by a method, a brake assembly and a storage medium.

The embodiments relate to a method for operating a brake of a motor vehicle. The brake has an actuator, which moves to positions along a path and generates a braking torque depending on the positions. The method comprises the following steps:

recording a braking torque/travel characteristic curve of the brake while the motor vehicle is in motion, and for keeping the motor vehicle stationary with a specified braking torque, ascertaining a position corresponding to the specified braking torque by means of the recorded braking torque/travel characteristic curve, and the actuator moving to the corresponding position.

By means of the procedure described in this document, a typical service braking operation can be used in order to record a braking torque/travel characteristic curve. Such service braking operations are carried out regularly during typical operation of a motor vehicle. The obtained braking torque/travel characteristic curve can then be used to move to a suitable position of the actuator when the vehicle is stationary, without separate measurements being required for this purpose. It is then possible to count on the brake being able to apply the required braking torque after the actuator has moved to the position.

For example, the brake can be considered to be a constituent part of a motor vehicle. However, in principle, it is a component which is contained in a motor vehicle and can also be handled independently. The path can be specified, for example, along a linear distance. For example, the braking torque/travel characteristic curve can assign a respective braking torque to each position or to several positions along the path. The braking torque is typically measured, for example in a support bearing. It is also possible to assign positions to braking torques. The braking torque/travel characteristic curve can be specified for example in tabular form or as a function.

Measurement of the braking torque while the motor vehicle is kept stationary can be dispensed with in the embodiment described in this document.

The braking torque/travel characteristic curve can be recorded during a service braking operation, in particular. As a result, it is not necessary to read out additional braking processes just to record a braking torque/travel characteristic curve. Service braking operations are typically used to slow down a motor vehicle due to general traffic conditions, road traffic regulations or hazardous situations. They occur regularly during operation of a motor vehicle, for example in public areas. They can be triggered for example by way of a driver pressing a brake pedal or by a driver assistance function requesting a braking operation.

The vehicle can be kept stationary, for example in response to activation of a parking brake functionality. This can be triggered, for example, by means of a switch or a button. This allows the driver to typically indicate that the vehicle is to be parked, that is to say it should no longer be moved for the time being.

The specified braking torque can be ascertained, for example, based on an operating state of the vehicle. This allows components such as load, slope of the ground, temperature or wear of the brakes to be taken into account, for example.

The braking torque/travel characteristic curve can be recorded, for example, at specified time intervals and/or in specified operating states. For example, after a predetermined time interval has elapsed, it is always possible to wait until the next service braking operation is triggered, and then the braking torque/travel characteristic curve can be recorded for this service braking operation. It can also be recorded in different operating states, for example at different temperatures or under different load situations, in a targeted manner. This can be accordingly taken into account when moving to the position for keeping the motor vehicle stationary. For example, a braking torque/travel characteristic curve can be used to keep the motor vehicle stationary, this braking torque/travel characteristic curve having been recorded with equivalent operating parameters, for example at the same temperature or at a temperature in a predetermined range around the current temperature.

For example, it may be provided that, after the corresponding position has been moved to, no adjustment takes place, while the motor vehicle is kept stationary. The procedure described in this document can be used to ensure that sufficient braking force is available to keep the motor vehicle stationary. This means that adjustment can be dispensed with. Therefore, it may be possible to dispense with providing adjustment means which would require, for example, additional sensors and/or monitoring functionalities.

In particular, the braking torque can be measured by means of a brake force sensor. This brake force sensor may be located, for example, in a support bearing of a drum brake. The position can be measured, in particular, by means of a position sensor, in particular a motor position sensor. This allows the position to be adjusted in a targeted manner. As an alternative, the position can also be derived deterministically, for example, from revolutions of an electric motor.

For example, the actuator can be an electromagnetic actuator. This has proven to be useful for typical applications. However, other types of actuators can also be used.

The embodiments further relate to a brake assembly for a motor vehicle. The brake assembly has an actuator and an electronic control device, which is configured to execute a method as described in this document. With regard to the method, reference can be made to all of the described embodiments and variants.

The embodiments further relate to a non-volatile, computer-readable storage medium containing program code that, when executed, results in a processor executing a method as described in this document. With regard to the method, reference can be made to all of the embodiments and variants described in this document.

The method described in this document can be used, for example, for electromechanical drum brakes. The brake assembly can be, for example, an electromechanical drum brake.

In other words, electromechanical parking brakes for example can be controlled using a motor current. This motor current typically exhibits a correlation to the spreading force. Owing to fluctuations in the degree of efficiency in the transmission, a large degree of scatter can occur when determining the spreading force based on the motor current. The spreading force is typically required to determine, with an estimated coefficient of friction, the maximum possible braking torque, which should be greater than the required downhill moment in order to securely hold the vehicle. By linking motor current with respect to spreading force up to the braking torque, there can be a very high degree of scatter in the set braking torque. This can lead to overloading of the components or to a necessary increase in the robustness of the components.

The embodiment described in this document can be used, for example, for identifying parking brake actuation for electromechanical drum brakes. An increased number of sensors can allow, for example, new possible solutions, for example in order to reduce increased load and uncertainty of guaranteed vehicle holding by known electric parking brake systems.

For example, in the case of electromechanical drum brakes, which exhibit braking torque measurement and which typically have a motor position sensor, a motor position/braking torque characteristic curve can be generated. This can be regarded as a synonymous term for a braking torque/travel characteristic curve. Parking brake actuation can be based on a travel/braking torque characteristic curve. This, too, can be regarded as a synonymous term for a braking torque/travel characteristic curve.

The brake torque-based position control of the parking brake offers, for example, increased slope holding stability, the lack of a need for top-of-force compensation with an associated reduction in expenditure on software, avoidance of increased overstressing of the system with a reduction in the load profile by more precise actuation and a reduction in the requirement for robustness while increasing the number of cycles, and also various diagnostic options.

BRIEF DESCRIPTION OF THE DRAWINGS

A person skilled in the art will gather further features from the exemplary embodiment described below with reference to the appended drawing, in which.

DETAILED DESCRIPTION

Figure 1:
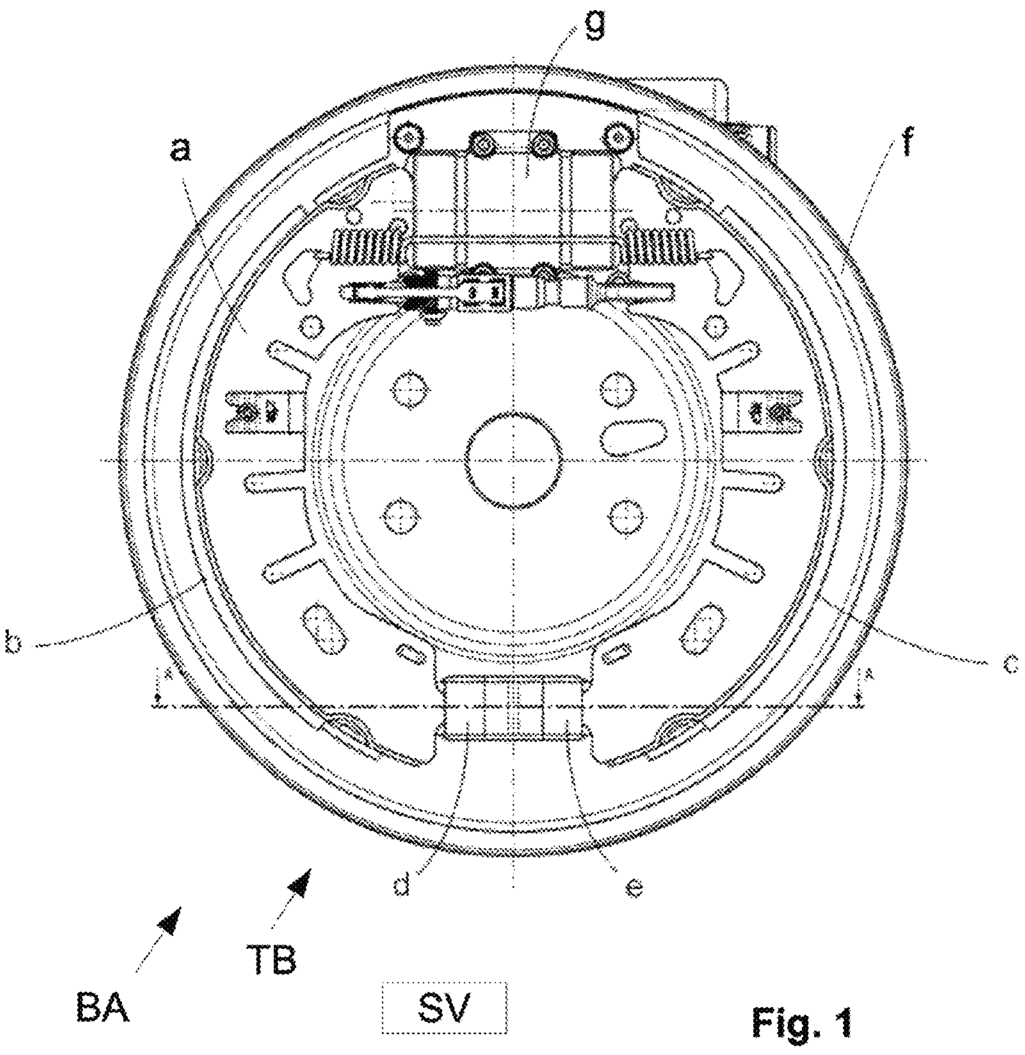
FIG. 1: shows a brake assembly.

FIG. 1 shows a brake assembly BA having a drum brake TB and a control device SV. The control device SV is configured to execute a method in accordance with the embodiments. This will be discussed in more detail later on.

The drum brake TB can be understood to mean, for example, a service brake with a parking brake function.

The drum brake TB has a back plate a, on which brake shoes b, c are mounted. These are arranged within a brake drum f. The drum brake TB further has a spreading unit g, which presses the brake shoes b, c against the inside of the brake drum f. Reaction forces of the brake shoes b, c are supported on support bearings d, e here. These are equipped with force sensors, as a result of which a braking torque can be ascertained by calculating the two variables supplied by the force sensors.

Figure 2:
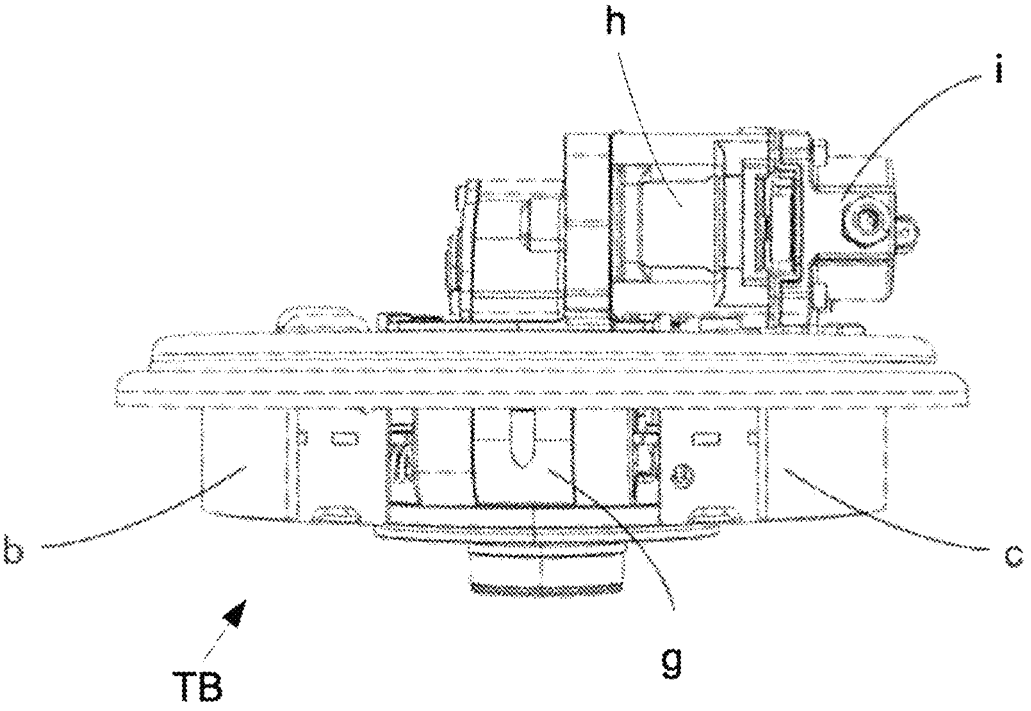
FIG. 2: shows another view of the brake assembly from FIG. 1.

FIG. 2 shows a plan view of the drum brake TB. It can be seen that the spreading unit g for driving has an actuator h, which in turn has a motor position sensor i. The actuator h is designed, by way of example, as a brushless DC motor which is electrically commutated.

Measurement of the braking torque is a prerequisite for the further method steps disclosed in this document and can also be implemented in other ways, for example.

Figure 3:
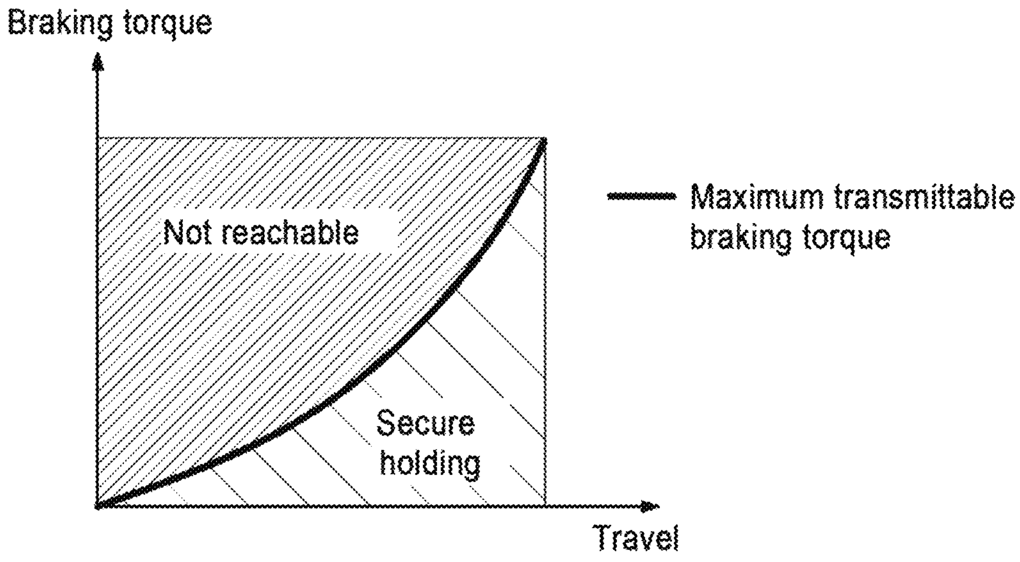
FIG. 3: shows a braking torque/travel characteristic curve.

By measuring the two variables braking torque and motor position, it is possible to ascertain a motor position/braking torque characteristic curve, also known as the braking torque/travel characteristic curve, while using the service brake (while a vehicle is in motion). This can be permanently calibrated, for example during service braking operations, since a change in the characteristic curve may occur due to wear and variation in the coefficient of friction. The characteristic curves determined while a vehicle is in motion represent a limiting situation in the braking torque/travel characteristic curve, at which a unique braking torque is generated depending on the motor position. This is illustrated in FIG. 3, for example. This is applicable for the current state (wear, coefficient of friction) of the maximum possible braking torque at the given position. When stationary (parking), this relationship is no longer present since the braking torque generated by the brake is only as high as the load torque acting from the outside (especially downhill moment). Therefore, the generated braking torque when a vehicle is stationary cannot be influenced by the motor position as long as the current state is below the limit characteristic curve. This area is referred to as "Secure holding" in FIG. 3.

If the braking torque required for secure holding in the respective situation is clearly defined for a vehicle, the corresponding motor position is therefore also known. This can be adjusted via an engine position controller, so that the parking brake keeps this position permanently de-energized.

The braking torque/travel characteristic curve allows a prediction to be made for the securely held braking torque. Adjustment strategies are typically no longer required in the method. Overstressing of the system is also prevented, in particular due to the precise prediction and activation.

By measuring the motor position, braking torque and current, it is possible to check the system, as a result of which a diagnostic capability is provided. In this way, a conclusion can be drawn about the degree of efficiency, for example if the current requirement is too high.

Figure 4:
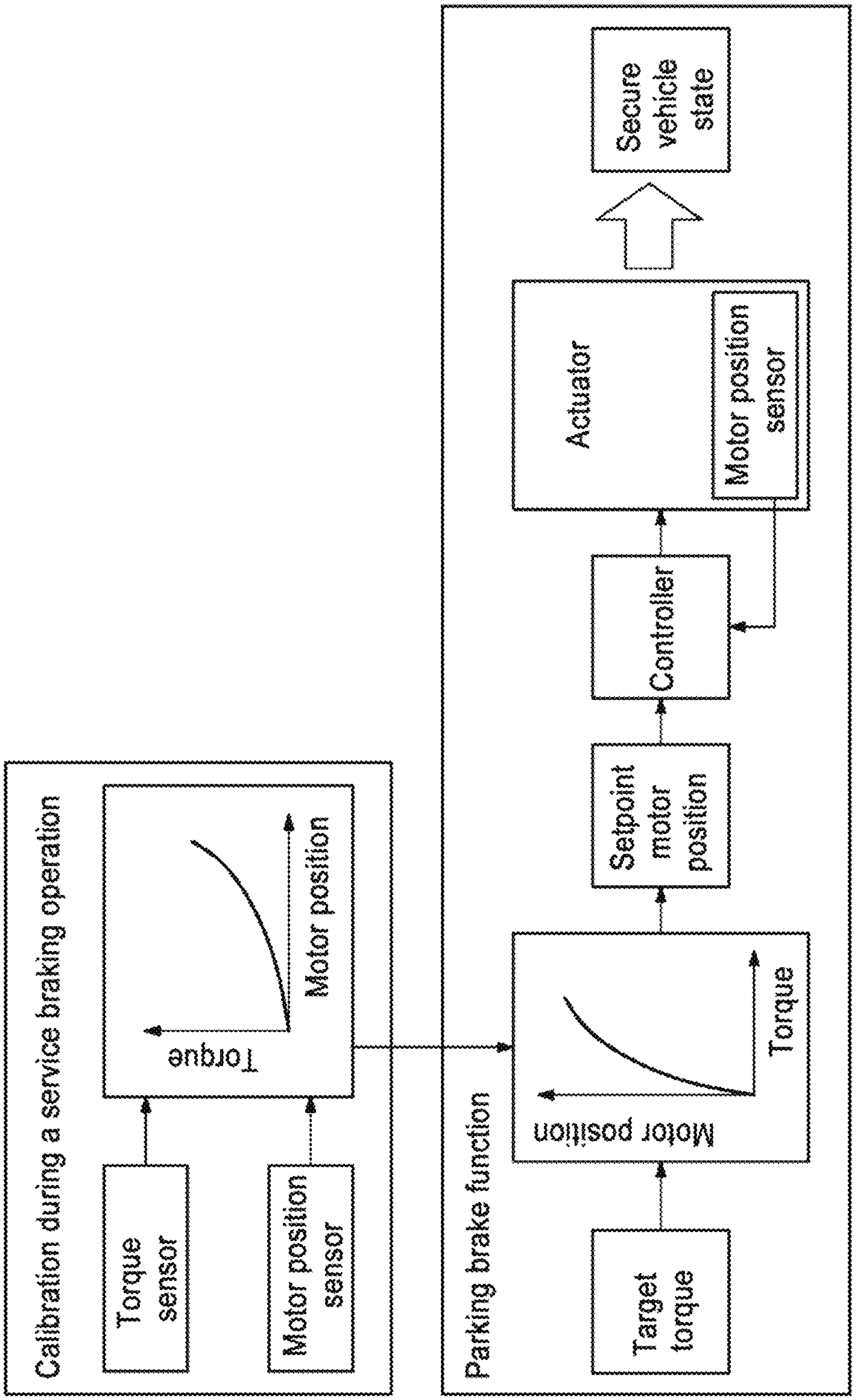
FIG. 4: shows a block diagram.

FIG. 4 shows a block diagram of the method. In said figure, calibration during a service braking operation is first shown at the top. A characteristic curve which is similar to that of FIG. 3 and assigns the braking torque to a respective motor position, also referred to as travel, is determined via a torque sensor and a motor position sensor.

The function of a parking brake is shown in the block below. First, a target torque is specified, which ultimately represents the desired maximum braking torque for keeping the vehicle stationary. A setpoint motor position is ascertained based on the characteristic curve ascertained further above. This setpoint motor position is supplied to a controller, which in turn actuates an actuator. The actuator can be in the form of an electric motor, for example. It is monitored by a motor position sensor, which provides an input variable to the controller. Once the setpoint motor position has been reached, the vehicle is in a secure state.

Overall, the procedure described in this document can save effort and nevertheless ensure that the motor vehicle is securely kept stationary.

Mentioned steps of the method can be executed in the specified order. However, they can also be executed in a different order, if technically feasible. The method can be executed in one of its embodiments, for example with a specific set of steps, in such a way that no further steps are executed. However, further steps can also be executed in principle, even those that are not mentioned.

It is pointed out that features may be described in combination in the claims and in the description, for example in order to facilitate understanding, even though these can also be used separately from one another. A person skilled in the art recognizes that such features, independently of one another, may also be combined with other features or combinations of features.

Dependency references in dependent claims do not exclude other combinations of features.

The invention claimed is:

1. A method for operating a parking brake (TB) of a motor vehicle, comprising:

recording at least one of a braking torque and travel characteristic curve of the brake while the motor vehicle is in motion, ascertaining a corresponding position of an actuator at which the actuator generates a specified braking torque for keeping the motor vehicle stationary, and moving the actuator to the corresponding position.

2. The method as claimed in claim 1, wherein recording the at least one of the braking torque and travel characteristic curve is during a service braking operation.

3. The method as claimed in claim 1, wherein the vehicle is kept stationary in response to activation of a parking brake functionality.

4. The method as claimed in claim 1, wherein the specified braking torque is ascertained based on an operating state of the vehicle.

5. The method as claimed in claim 1, wherein the at least one of braking torque and travel characteristic curve is recorded at one of specified time intervals and in specified operating states.

6. The method as claimed in claim 1, wherein, after the actuator has moved to the corresponding position no adjustment takes place, while the motor vehicle is kept stationary.

7. The method as claimed in claim 1, wherein the braking torque is measured with at least one of a brake force sensor, and/or wherein a position is measured with a motor position sensor.

8. The method as claimed in claim 1, wherein the actuator is an electromagnetic actuator.

9. A parking brake assembly for a motor vehicle comprising:

an actuator, and an electronic control device which is configured to execute steps comprising:

recording at least one of a braking torque and travel characteristic curve of the brake while the motor vehicle is in motion, ascertaining a corresponding position of an actuator at which the actuator generates a specified braking torque for keeping the motor vehicle stationary, and moving the actuator to the corresponding position.

10. A non-volatile, computer-readable storage medium containing program code that, when executed, results in a processor executing steps comprising:

recording at least one of a braking torque and travel characteristic curve of a parking brake while a motor vehicle is in motion, ascertaining a corresponding position of an actuator at which the actuator generates a specified braking torque for keeping the motor vehicle stationary and moving the actuator to the corresponding position.

* * * * *